(12) United States Patent
Neff et al.

(10) Patent No.: US 6,215,499 B1
(45) Date of Patent: Apr. 10, 2001

(54) METHOD AND APPARATUS FOR INTERACTIVE CURVED SURFACE SEISMIC INTERPRETATION AND VISUALIZATION

(75) Inventors: Dennis B. Neff; John R. Grismore; Jacquelyn K. Singleton, all of Bartlesville; Jesse E. Layton, Ochelata, all of OK (US)

(73) Assignee: Phillips Petroleum Company, Bartlesville, OK (US)

( * ) Notice: Subject to any disclaimer, the term of this patent is extended or adjusted under 35 U.S.C. 154(b) by 0 days.

(21) Appl. No.: 09/306,611

(22) Filed: May 6, 1999

(51) Int. Cl.[7] .................................................. G06T 17/00
(52) U.S. Cl. ............................ 345/419; 367/37; 367/38
(58) Field of Search .................................... 345/418, 419, 345/420, 433, 434, 435, 436, 438, 439; 367/70, 72, 37, 38, 47

(56) References Cited

U.S. PATENT DOCUMENTS

| | | |
|---|---|---|
| 4,467,461 | 8/1984 | Rice et al. .............................. 367/70 |
| 4,633,448 | 12/1986 | Koeijmans ............................. 367/72 |
| 4,661,935 | 4/1987 | Shock et al. ........................... 367/70 |
| 4,809,240 | 2/1989 | Mufti ..................................... 367/72 |
| 4,876,673 | 10/1989 | McCowan .............................. 367/68 |
| 5,717,455 | 2/1998 | Kamewada ............................ 348/85 |
| 6,028,606 * | 2/2000 | Kolb et al. ............................ 345/433 |
| 6,031,538 * | 2/2000 | Chupeau et al. ..................... 345/419 |
| 6,078,351 * | 6/2000 | Hall, Jr. et al. ...................... 345/419 |
| 6,081,269 * | 6/2000 | Quarendon ........................... 345/419 |
| 6,084,587 * | 7/2000 | Tarr et al. ............................. 345/419 |

* cited by examiner

Primary Examiner—Cliff N. Vo
(74) Attorney, Agent, or Firm—George E. Bogatie

(57) ABSTRACT

An enlarged computer graphic image of seismic data is displayed on a concave three-dimensional surface having a shape corresponding to the shape of selected data extracted from a three-dimensional seismic volume. Thus providing an enlarged image of a seismic surface where the data is spatially correct in three-dimensions, and which increases the ease with which interpreters can locate geological features such as horizons, faults, and channels.

20 Claims, 10 Drawing Sheets

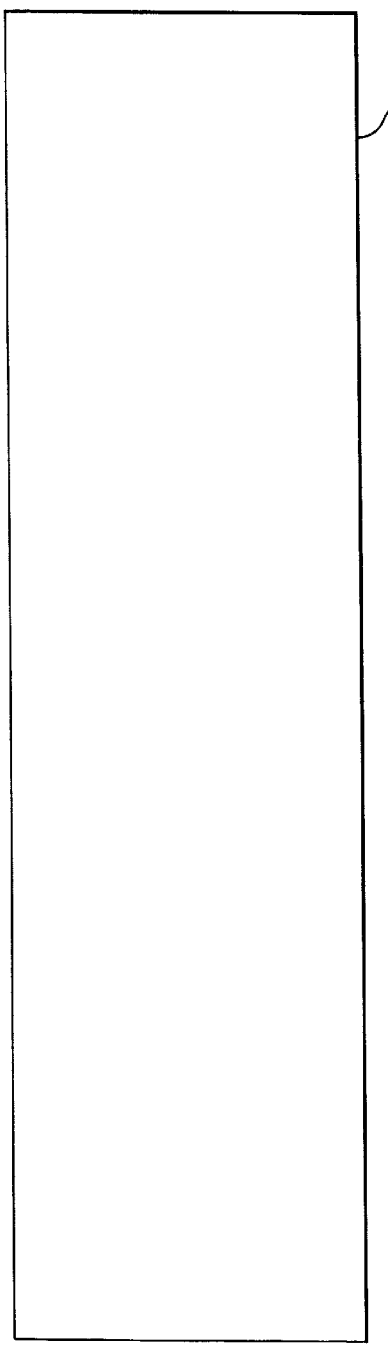
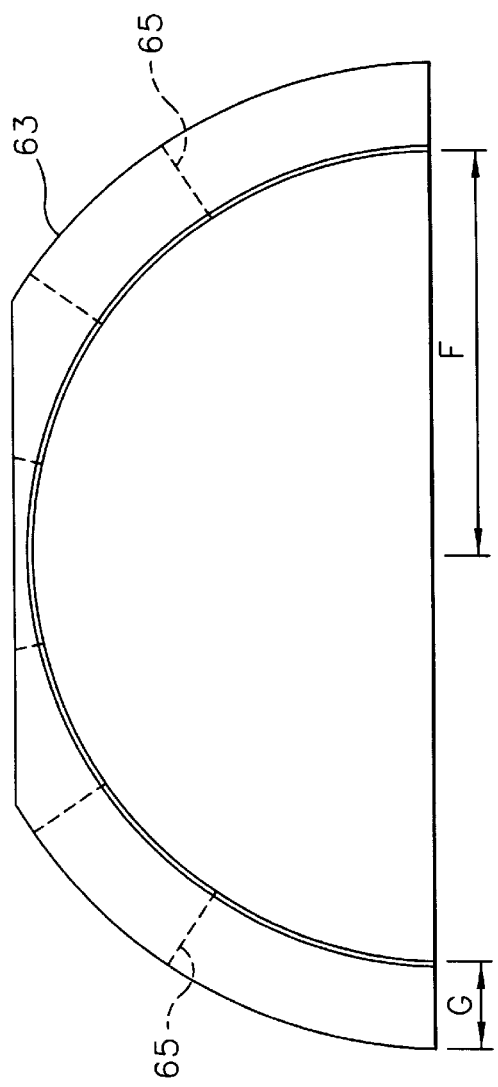
FIG. 5(c)
FIG. 5(b)

METHOD AND APPARATUS FOR INTERACTIVE CURVED SURFACE SEISMIC INTERPRETATION AND VISUALIZATION

This invention relates to a method and apparatus for projecting spatially correct seismic data onto a large three-dimensional (3D) curved display surface, to aid in interpretation of geological characteristics of the earth. More specifically, this invention relates to a method for projecting computer graphic video images of seismic data onto a large curved 3D display surface, allowing viewers to interact with the 3D display, and to use their peripheral vision, and thus perceive the displayed imagery with a sense of realism comparable with natural viewing of a 3D physical reality.

BACKGROUND OF THE INVENTION

For many years seismic exploration for oil and gas has involved the use of a source of seismic energy and its reception by an array of seismic detectors, generally referred to as geophones. When used on land, the source of seismic energy can be a high explosive charge electrically detonated in a borehole located at a selected point on the terrain, or another energy source having capacity for delivering a series of impacts or mechanical vibrations to the earth's surface. Offshore, air gun sources and hydrophone receivers are commonly used. The acoustic waves generated in the earth by these sources are reflected back from strata boundary and/or other discontinuities and reach the earth's surface at varying intervals of time, depending on the distance traversed and the characteristics of the subsurface traversed. On land these returning waves are detected by the geophones, which function to transduce such acoustic waves into representative electrical analog signals, which are generally referred to as traces. In use on land an array of geophones is generally laid out along a grid covering an area of interest to form a group of spaced apart observation stations within a desired locality to enable construction of three-dimensional views of reflector positions over wide areas. The source, which is offset a desired distance from the geophones, injects acoustic signals into the earth, and the detected signals at each geophone in the array are recorded for later processing using digital computers, where the analog data is generally quantized as digital sample points, e.g., one sample every two milliseconds, such that each sample point may be operated on individually. The geophone array is then moved to a new position and the process is repeated to obtain a 3D data volume for a seismic survey.

After exploration of an area is completed, data relating to energy detected at a plurality of geophones will have been recorded, where the geophones are located at varying distances from the shotpoint. The data is then reorganized to collect traces from data transmitted at various shotpoints and recorded at various geophone locations, where the traces are grouped such that the reflections can be assumed to have been reflected from a particular point within the earth, i.e., a common midpoint. The individual records or "traces" are then corrected for the differing distance the seismic energy travels through the earth from the corresponding shotpoints, to the common midpoint, and upwardly to the various geophones. This step includes correction for the varying velocities through rock layers of different types and changes in the source and receiver depths. The correction for the varying spacing of shotpoint/geophone pairs is referred to as "normal move out." After this is done the group of signals from the various midpoints are summed. Because the seismic signals are of a sinusoidal nature, the summation process serves to reduce noise in the seismic record, and thus increasing its signal-to-noise ratio. This process is referred to as the "stacking" of common midpoint data, and is well known to those skilled in the art. Accordingly, seismic field data undergoes the above-mentioned corrections, and may also undergo migration, which is an operation on uninterpreted data and involves rearranging of seismic information so that dipping horizons are plotted in their true location. Other more exotic known processing techniques may also be applied, which for example enhance faults and stratigraphic features or some other attribute, before the continuously recorded traces are reduced to vertical or horizontal cross sections or horizontal map views which approximate subsurface structure, and are usually in color.

Despite significant progress in interactive 3D seismic interpretation systems, seismic workstations continue to rely on vertically and horizontally displayed planar slices of recorded data to provide almost all of the "working surfaces" for horizon and fault picking, and correlation. These planar slices provide only a limited perspective of the full three dimensional picture. Often animation of successive slices is required to provide information about the third dimension. However, animation intrinsically forces a three-dimensional interpretation based on the interpreters memory of the changing picture through time, rather than on direct comparison and correlation of the data.

Once the seismic data is satisfactorily processed to incorporate necessary corrections and desired enhancements, the geophysicist interprets the 3D seismic information. In general terms, interpretation involves deriving a simple plausible geological subterranean model that is compatible with the observed data. This model is never unique, and discovering it involves a sequence of somewhat arbitrary choices.

Accordingly, it is an object of this invention to create a truly three-dimensional interactive graphic workstation to aid in geological interpretation of seismic data.

A more specific object of this invention is to visualize spatially correct seismic data on a large concave screen that facilitates horizon and fault mapping of seismic data.

Still another object is to provide a projection system for computer graphic images of seismic data that includes a portable self-supporting rigid screen with a concave inner display surface, which is economical in cost, and includes about fifty times more viewing area compared to conventional seismic workstation monitors.

Another more specific object of this invention is to provide a desk-top-based projection system having a concave screen, and a projector located about nine feet in front of the curved screen for use in interactive desk top viewing environments.

A further object is to provide a projection display system which can be used to view large scale monoscopic as well as stereoscopic color imagery of three-dimensional seismic data.

SUMMARY OF THE INVENTION

According to the present invention the foregoing and other objects and advantages are attained in a method and apparatus for extracting, mapping and projecting 3D seismic data to its spatially correct location on a relatively large concave 3D display surface. The method is based on computer software, and involves storing a volume of digitally formatted seismic data in memory of a suitable computer as a first step. A mathematical model is then created corresponding to the shape of the concave 3D display surface, and the mathematical model is inserted in the computer memory so as to at least partially intersect the seismic data volume.

The intersecting seismic data is extracted and mapped onto an image plane. Next the extracted data is processed using digital computational techniques so as to maintain correct spatial position for the varying projector to screen distances associated with the concave 3D display surface, and is then projected onto the concave display surface in its spatially correct dimensions. This means that the displayed seismic data is not a vertical slice of seismic data projected onto a curved screen, but is data carved out of the 3D data volume corresponding to the shape of the concave display surface.

Accordingly, the apparatus of this invention includes a relatively large 3D display surface compared to a typical CRT monitor screen, and which is suitable for positioning on a desk or tabletop. The presently preferred 3D display surface facilitates viewing on four commonly used screen types including: a flat wall, multiple adjacent flat walls, a concave semidome, and a semicylindrical wraparound screen. The various screen types are combined into a single screen referred to herein as a "hybrid" screen, which includes three sections, i.e., a ceiling section which is a concave semidome extending 180 degrees horizontally, and 90 degrees vertically, a semicylindrical lower screen panel, and a flat semicircular floor section. The semidome is elevated above the desktop supported by the cylindrical lower section which is edgewise connected to the semidome. The semicircular floor area completes the display surface. A video projector for displaying the seismic data, which allows the high speed graphic output of a computer system to be projected, enlarged and focused onto a concave screen, is located at a convenient distance from the display surface. Accordingly, computer generated signals control the view to be displayed, and the views include animation of successive images derived from the volume of data to display spatially correct seismic information throughout the data volume.

Also connected to the computer, or parallel computers as the case may be, is a keyboard, a mouse, two CRT [seismic] workstation monitors and a relatively small flat auxiliary screen in the shape of a paddle, that can be held by the geophysicist and positioned within the volume inside of the larger concave display.

In a preferred embodiment, an electromagnetic positioning transmitter mounted on the outside of the concave display surface in combination with a paddle mounted receiver detect the position and orientation of the moveable paddle throughout the space defined within the hybrid screen, and an interactive video image is displayed on the paddle for exploring the volume within the hybrid screen. In simulation work the image on the paddle could represent a view corresponding to a rear view mirror. Further, in mining or seismic displays, the paddle can display petrophysical properties of rocks or acoustic waves that are present at that relative position in the interior of the concave display surface.

The method and apparatus of this invention using a large 3D display surface, thus can display a variety of useful views, which are helpful in picking or interpreting seismic horizons and fault segments observed on the surface of the hybrid screen. These views include: 1) a wraparound 180-degree display using only the semicylindrical lower portion of the screen, 2) a 180-degree by 90-degree dome display using the semidome ceiling only, 3) a 180-degree wraparound plus floor display using the combination of the semicylindrical lower screen panel and the floor, 4) a single wall or a three-wall display using the semicylindrical lower screen panel divided into three subareas, 5) a single wall plus floor using the combination of a subarea of the semicylindrical lower screen panel and the floor, and 6) a silo with a floor, where the entire concave display surface is illuminated. In addition the software incorporates real-time navigation through a data volume, and facilitates interactive features including: translate, zoom and rotate. This provides the user with full flexibility to explore the entire data volume, and simplifies quick interactive reconnaissance viewing of the 3D seismic data volume from a variety of viewpoints.

Still other objects and advantages of the present invention will become readily apparent to those skilled in this art from the following detailed description and the drawings, wherein there is shown and described only one of the several preferred embodiments of the invention. While the best mode contemplated for carrying out the invention is illustrated as applied to a particularly shaped concave 3D display surface, it will be realized that the invention is suitable for other and different embodiments such as projecting the spatially correct seismic surfaces, or any other data formatted as a 3D digital volume, onto any desired shaped surface, such as the interior of a hemispherical display surface, the outer surface of a sphere, a corner between walls or a flexible screen curved to a desired shape. Also several details of the invention are subject to modification in various obvious respects, all without departing from the invention. Accordingly, the description of the invention and the drawings are to be regarded as illustrative in nature, and not as restrictive.

BRIEF DESCRIPTION OF THE DRAWINGS.

FIGS. 5(a)–5(b) are plan views showing top and lower horizontal support members respectively for the semidome of the hybrid screen.

FIG. 5(c) is a front elevation of the lower screen panel.

DETAILED DESCRIPTION OF A PREFERRED EMBODIMENT

Referring first to FIGS. 1 through 5(c), the illustrated projection display system of the present invention will be described in greater detail hereinbelow. In general, the present projection display system can be used to display images carved out of digital formatted data volumes, whether the data is real, synthetic, or part real and part synthetic, and has obvious utility to many industrial applications in addition to seismic visualization and interpretation, including but not limited to:

1) manufacturing design reviews,
2) ergonomic simulation,
3) safety and training,
4) video games,
5) cinematography,
6) scientific 3D viewing, and
7) medical displays.

The invention, however, will be illustrated with reference to projecting seismic data on a hybrid screen. Suitable computer software techniques for generating seismic displays of spatially correct dimensions on a large 3D display surface, and for driving a video projector with computer generated signals will be more fully explained hereinafter.

Figure 1:
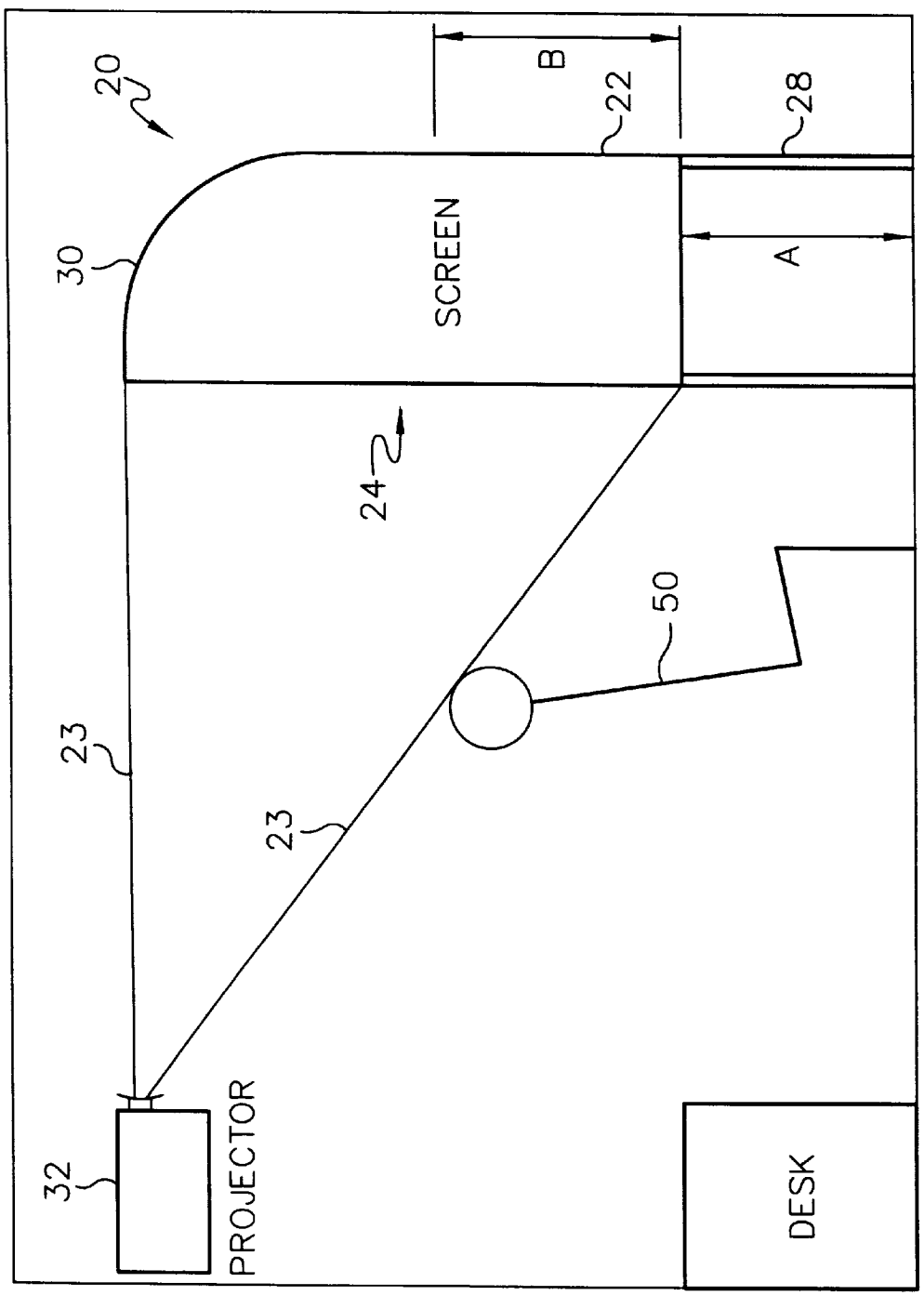
FIG. 1 is a schematic elevation side view of a video projection system located in an average sized domestic room, showing the full projection ray viewing volume according to this invention.
Figure 2:
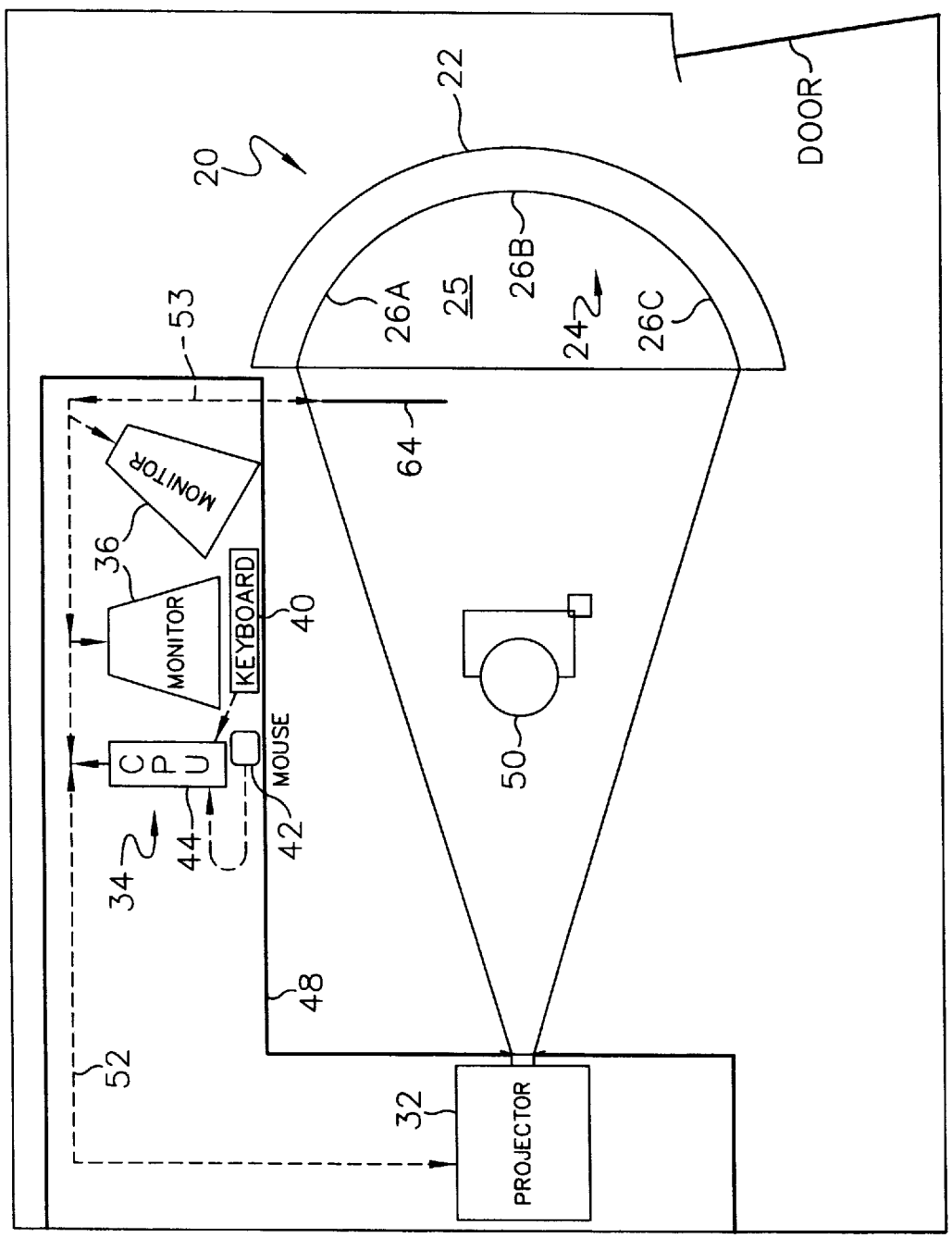
FIG. 2 is a schematic plan view of the video projection system located in the room illustrated in FIG. 1, and showing an arrangement of computer, projector and related digital equipment.

As best shown in FIGS. 1 and 2, the projection display system has several major components, i.e.: a 3D structure for displaying images generally indicated at 20, and referred to herein as a hybrid screen, one or more image projectors 32 for projecting color images onto the hybrid screen, and an associated computer system generally shown at 34 for generating video images.

The presently preferred hybrid screen 20 is of compact unitary construction having three sections forming a generally concave display surface, the sections include: a concave semidome ceiling section 30; a semicylindrical lower section 22, and a flat semicircular floor section 25. The cylindrical screen section 22, which is also illustrated in FIG. 5(c), is edgewise mounted to a lower edge of the semidome 30. Projection rays illustrated by lines 23 indicate the limits of the viewing volume of the full screen 20. It is noted, however, that the viewing volume may be adjusted to illuminate only desired sections or subareas of the full screen. The concave display surface of the hybrid screen 20 is generally indicated at 24, and includes the semidome section 30, which is elevated above the desk 28 by edgewise mounting on the semicylindrical screen section 22. Also as illustrated in FIG. 2 the cylindrical screen section 22 includes left, central and right subarea display surfaces 26A, 26B and 26C respectively, such that three independent wall views can be simultaneously displayed on the three designated subareas. Still referring to FIGS. 1 and 2, the lower edge of the semicylindrical display screen 22 is attached to flat semicircular floor section 25. Thus, supporting the semidome section above the desk 28.

Any suitable material such as wood, foam board, fiberglass or molded plastic can be used for construction of the hybrid screen. In the illustrated preferred embodiment the size of the hybrid screen with reference to the letters A and B in FIG. 1; C, D, and E in FIG. 3; F and G in FIG. 5(b) are shown in table 1 below:

TABLE 1

Typical Hybrid Screen Dimensions

| A | B | C | D | E | F | G |
|---|---|---|---|---|---|---|
| 27" | 24" | 31" | 55¾" | 72" | 30" | 6" |

The video projector 32 can be positioned at any suitable distance from the screen 20 to illuminate the full interior surface, or various subareas of the full surface, and is preferably wall mounted as shown in FIGS. 1 and 2. A preferred distance from the video projector to the above mentioned hybrid screen is about nine feet, such that, if desired, the projection system is suitable for viewing in a relatively small room. The projection system, however can be expanded for viewing in larger rooms. A commercially available computer workstation compatible projector 32 having high brightness and resolution that is suitable for use with the present invention is a model called Impression 1280, from a company called ASK, in Fredrikstad, Norway.

A suitable computer having a texture mapping graphic system with fast image generation, which can be programmed for carrying out the method of this invention, is a model called Octane available from Silicon Graphics Inc., Mountain View, Calif.

Referring specifically now to FIG. 2, an arrangement of the major components of the invention are illustrated. In FIG. 2, the computer system 34, which includes two workstation monitors 36, a keyboard 40, a mouse 42, and the computer 44, is positioned on a desktop 48. The hybrid screen 20 is also positioned on a desktop. As previously mentioned, the video projector 32 is preferably wall mounted a convenient distance from the hybrid screen 20, and is connected to the computer system 34 via cable 52. A user of the projection system is illustrated at 50.

Figure 3:
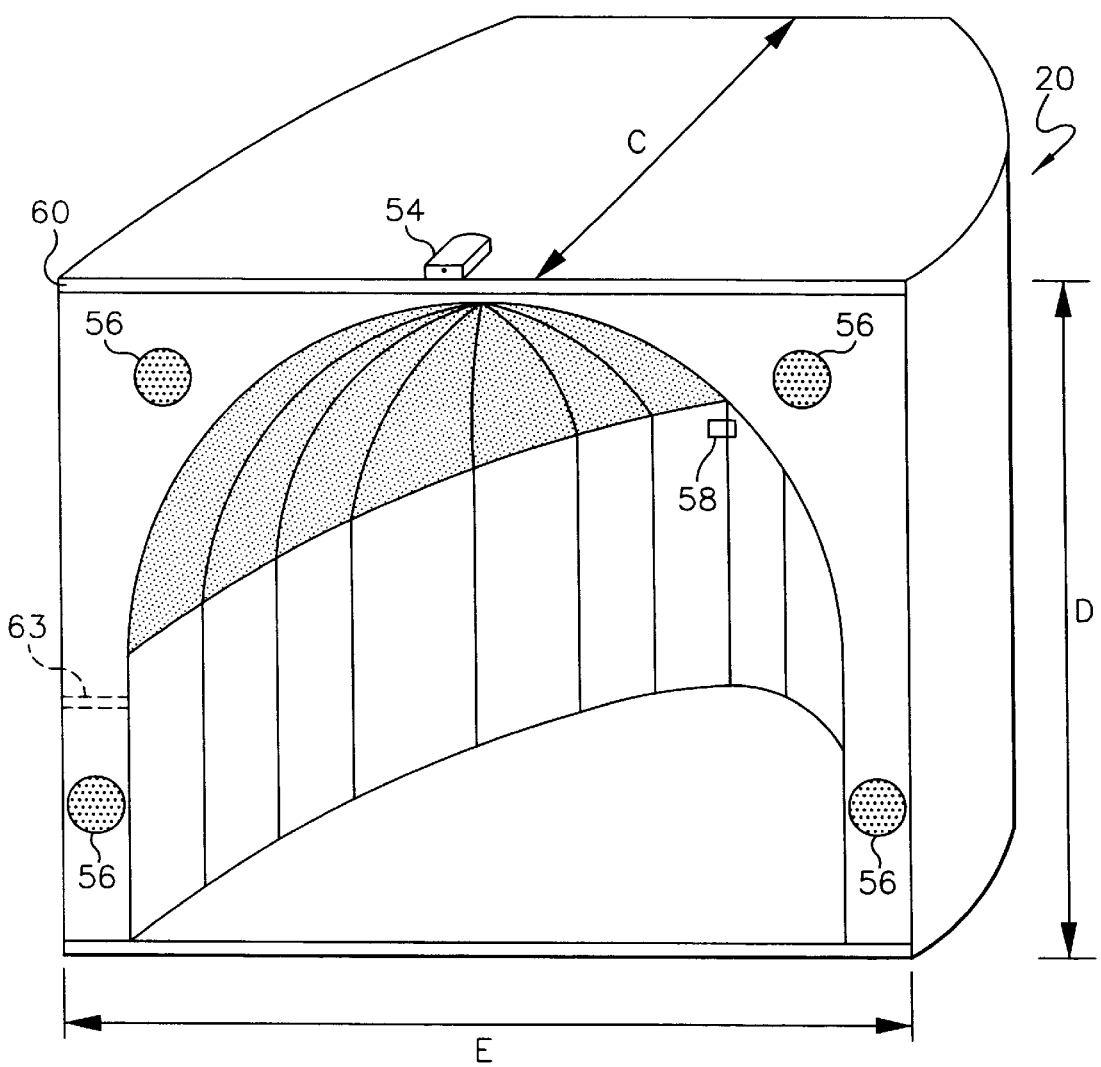
FIG. 3 is a perspective view of the hybrid screen.

FIG. 3 is a perspective view of the hybrid screen 20, and additionally illustrates a stereo emitter 54, four audio speakers 56, and an electromagnetic transmitter 58, all of which can be used with the present invention. Also illustrated is the position of horizontal support members 60 and 63 for the semidome section. Use of the stereo emitter, which is connected directly to the computer 44, is an option for viewing with the projection system, and requires battery powered glasses to detect an infrared signal from the emitter 54. A suitable emitter is a model ESGI, available from a company called StereoGraphics, San Rafael, Calif.

Additional information can be supplied to the seismic interpreter with four audio speakers. For example, as specific seismic attribute values change in the data volume, the pitch or amplitude of the audio tones can change accordingly. Using stereo or quad audio will also allow locating the sound source corresponding to the appropriate data area. Still further, multiple attributes may be compared by using different audio frequencies for different attributes, and this could create easily recognizable audio interference responses.

Figure 4:
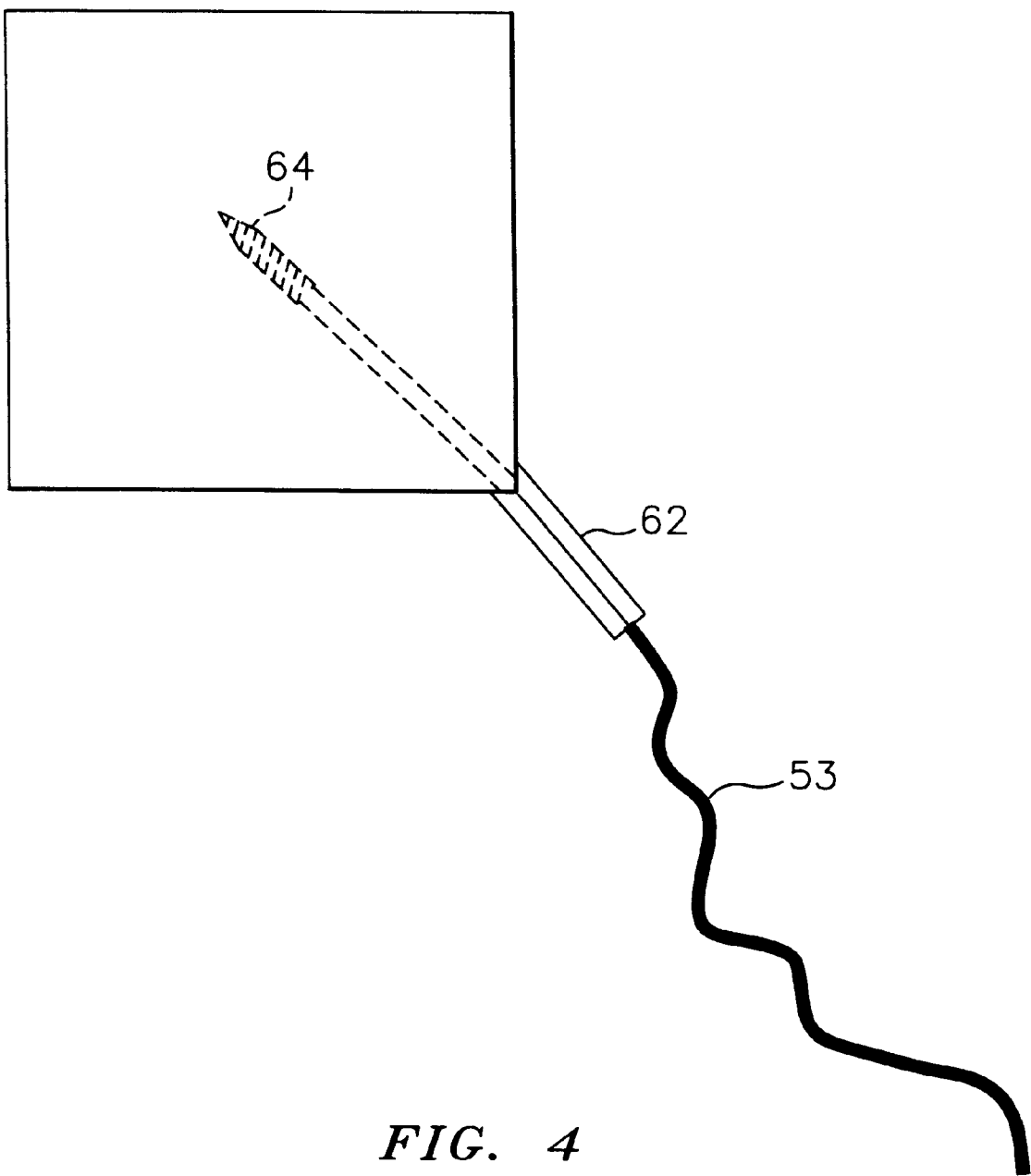
FIG. 4 is a schematic view of the auxiliary paddle screen.

Referring now to FIG. 4, there is illustrated a schematic view of the auxiliary paddle screen, which as previously mentioned can be interactively positioned to probe the space within the hybrid screen. The paddle is approximately one-foot square and can include other shapes like a circle or oval attached to a handle 62, and an electromagnetic receiver 64, which is mounted on the back side of the paddle screen. The receiver 64 cooperates with the transmitter 58, which is mounted on the hybrid screen as shown in FIG. 3 to detect the position and orientation of the paddle screen within the viewing volume of the hybrid screen 20. The electromagnetic receiver 64 is connected to the computer via cable 53. Suitable location detectors for tracking the position of the paddle screen, such as the electromagnetic transmitter 58 and receiver 64, are commercially available from a company called Polhemus, located in Colchester, Vt.

Figure 5A:
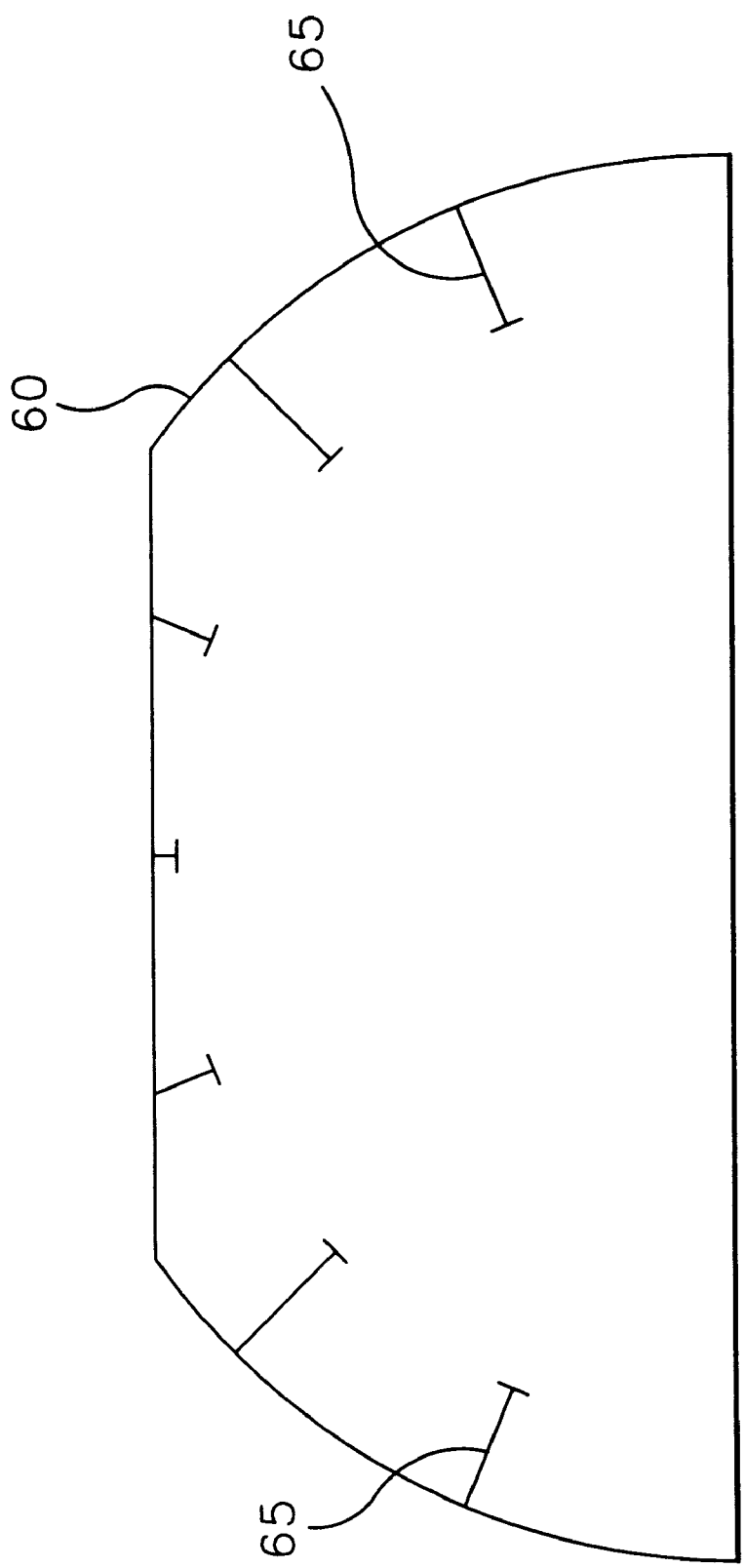

FIGS. 5(a) and 5(b) illustrate the shape of horizontal structural members 60 and 63 of the hybrid screen 20, which are positioned as shown in FIG. 3, and further shows the location of vertically mounted rib type structure members 65, which in turn support triangular shaped dome panels, not illustrated, that form the semidome concave viewing surface.

A 3D graphical hardware and software system for fast image generation will now be described in more detail beginning with reference to FIG. 6, where there is illustrated a simplified computer flow diagram showing the major steps in the method for displaying spatially correct seismic data onto a hybrid screen or a paddle screen according to this invention. The first step 66 is to store in computer memory a set of seismic data in the form of digitized seismic signal traces, which are to be visualized and/or interpreted, to provide the 3D seismic data volume. The next step 68 is to select a desired flat or concave shape for the seismic display of subsurface structure. Using the hybrid screen with appropriate extraction and projection operations, the display could correctly display data on a flat wall, a wraparound, or various combinations of flat walls, with or without a floor or a dome shaped ceiling. Selecting the combination of a semidome ceiling, a cylindrical lower section, and floor will illuminate the entire concave display surface of the hybrid screen. The program then proceeds to create a mathematical model corresponding to the shape of the selected display surface, and inserts the model into computer memory so as to at least partially intersect the 3D seismic data volume as illustrated at step 70. In step 72 the seismic data intersecting the mathematical model is extracted and mapped onto the surface of a two dimensional image plane. Next in step 74 video images of the seismic data mapped onto the image plane in step 72 are transferred to a video display buffer using well known texture mapping techniques. Finally, in step 76 the image formed in the video display buffer is projected onto the selected 3D display surface.

Figure 6:
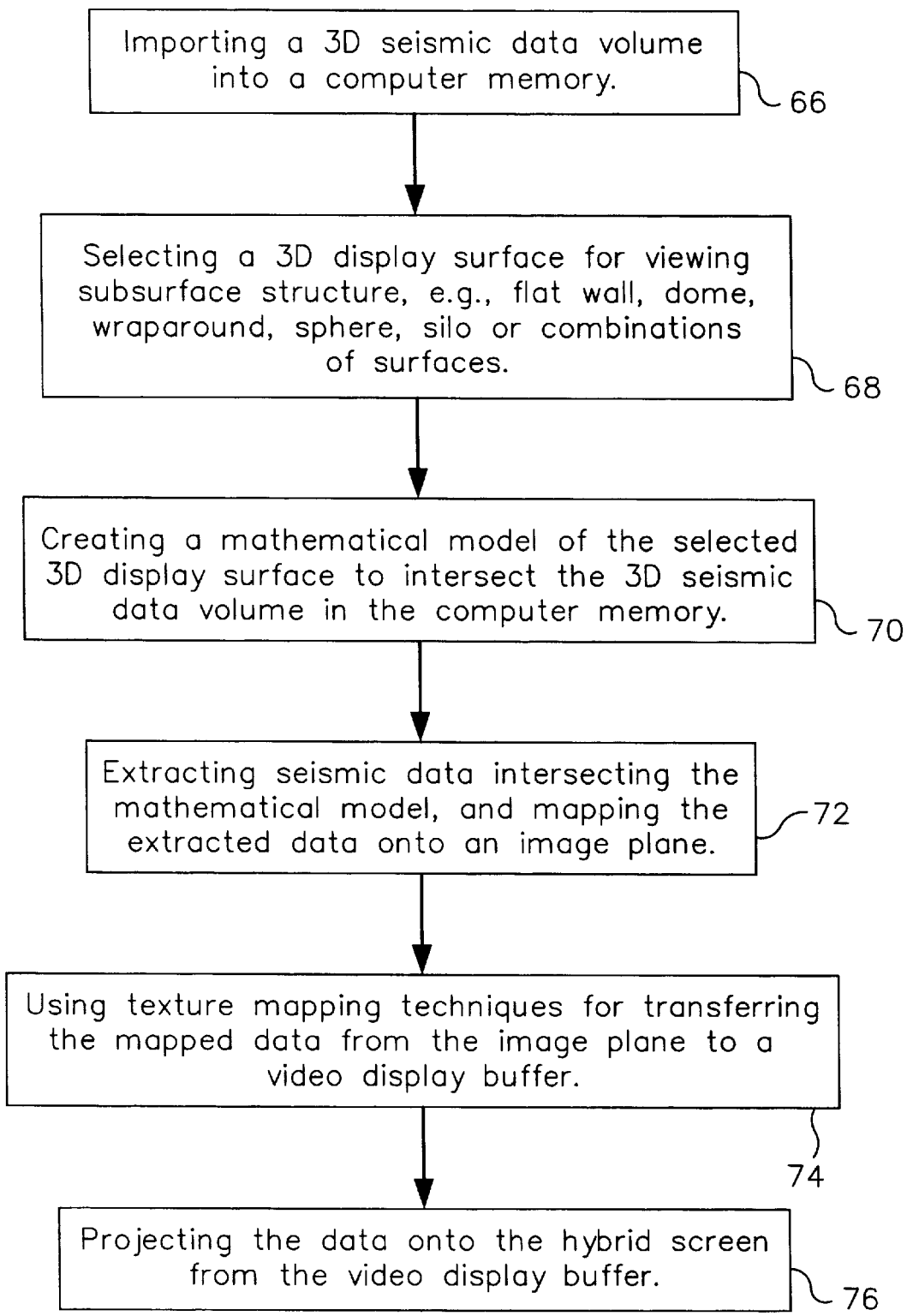
FIG. 6 is a simplified computer flow diagram showing the major steps of the method for displaying spatially correct seismic data according to this invention.
Figure 7:
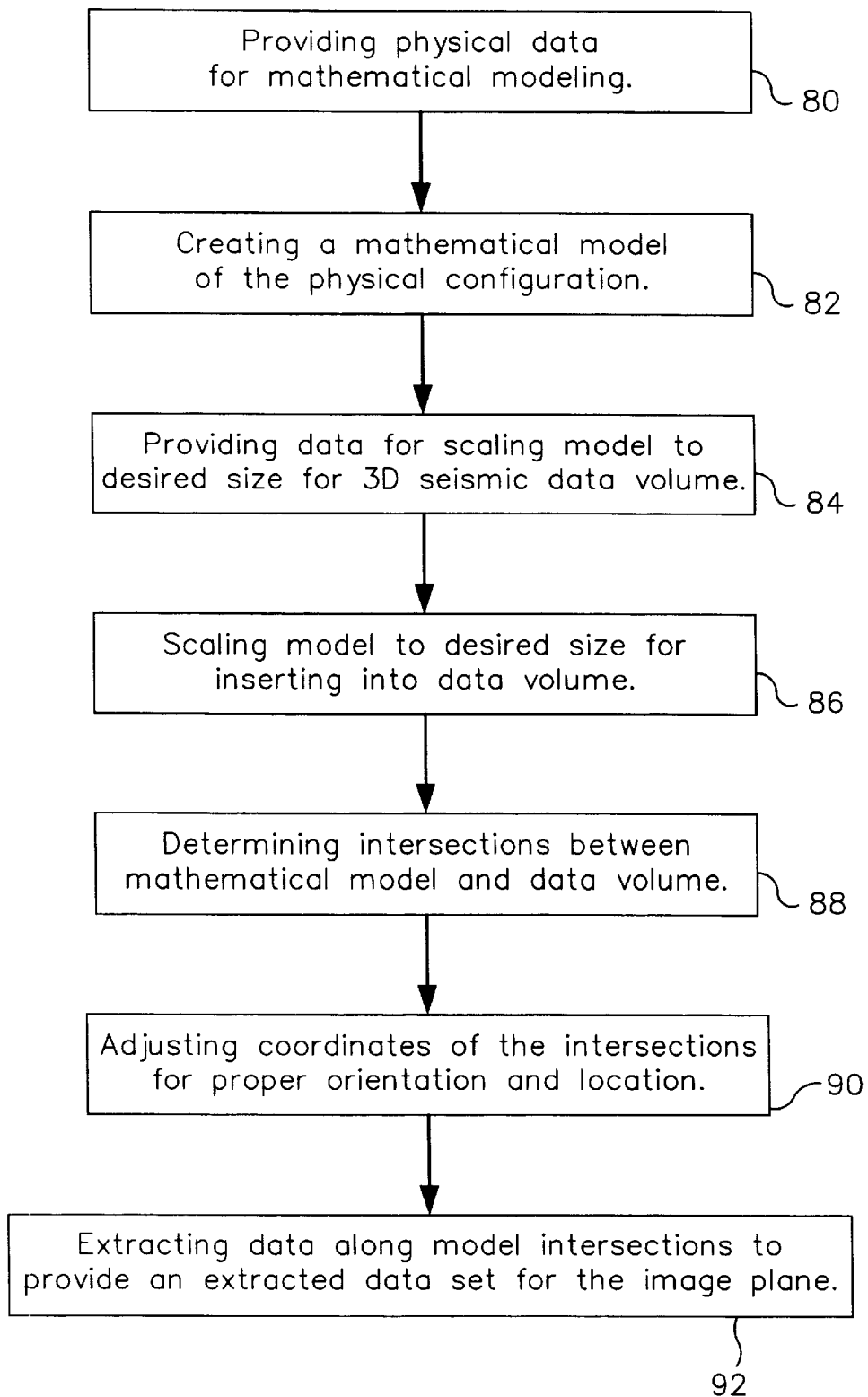
FIG. 7 is a computer flow diagram showing steps for extracting data intersecting the display surface from the 3D seismic data volume.

Referring now to FIG. 7, there is illustrated a computer flow diagram showing more details of the step 70 in FIG. 6 for creating a mathematical model of the selected 3D display surface. As a first step 80 in FIG. 7, the computer program is provided with physical data relating to the desired dimensions of the surface to be modeled, and a selected reference point within the modeled space. The program then proceeds to step 82 for creating the mathematical model of the physical configuration. This mathematical model is one or more algebraic equations describing the locus of all points on the surface to be modeled, and usually involves combinations of known solid 3D shapes such as a plane, a cylinder, a sphere etc. If more than one solid shape is required to describe this surface, multiple equations are used, which in combination can describe a full 3D concave display surface. For example, the previously mentioned hybrid screen can be modeled using the combination of equations describing a sphere, a cylinder and a plane. In step 84 additional data is provided to the computer program for scaling the model with reference to the data volume, including at least a specified size and target point for the model. In step 86 the mathematical model is scaled to a desired size. Next in step 88 the intersections between the mathematical model and the data volume are determined and in step 90 the coordinates of the intersections can be adjusted for a specified orientation and location. Finally in step 92 an extracted data set is obtained for mapping data onto the image plane.

Figure 8:
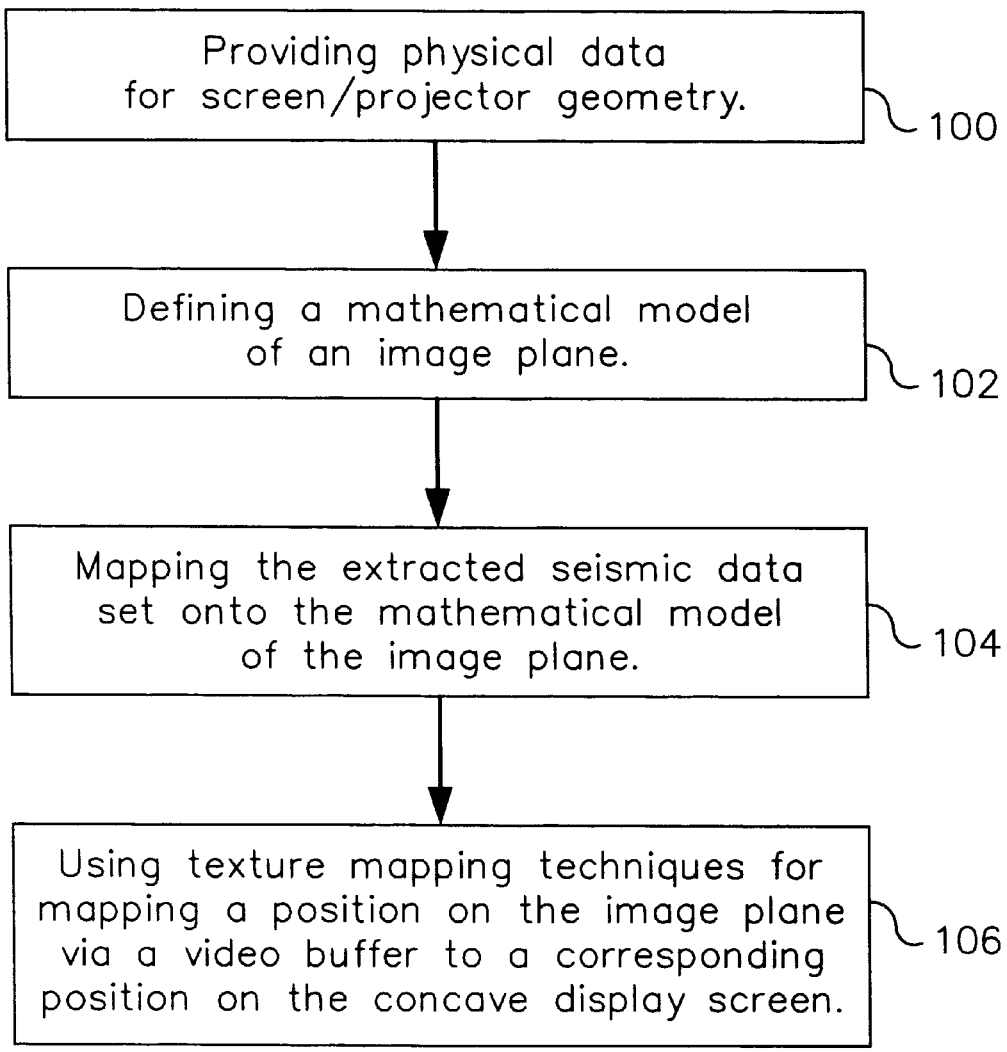
FIG. 8 is a computer flow diagram showing steps for mapping extracted seismic data onto an image plane assumed to be located in the ray projection volume between the projector and hybrid screen.

Referring now to FIG. 8, there is illustrated a computer flow diagram showing more details of steps 72 and 74 of FIG. 6 relating to mapping the extracted data and then displaying the mapped data. In step 100 the computer program is provided with data relating to screen/projector geometry including focal distances, desired ray projection volume, and dimensions of the display surface. Proceeding to step 102 a mathematical model of an image plane is defined and the extracted data is mapped onto the image plane in step 104 thus producing a mapped data set. From the image plane the mapped seismic data set is projected onto a concave 3D display screen, via a video image buffer, preferably using texture mapping techniques, although other known techniques may be used.

Various techniques for texture mapping are well known to those skilled in the field of computer graphics, and these texture mapping techniques are generally used to improve surface details of displayed images. Surface detail attributes commonly texture mapped include color, reflection, transparency, shadows, surface irregularities such as bumps or scratches, etc. In general, the texture mapping process effects mapping of a position on one plane onto a corresponding position of another plane and is suitable for transferring the mapped seismic data from the image plane to the video image buffer, which can then be projected onto the display surface. For further discussion of texture mapping and a survey of applications see e.g., Haeberli, et al., Silicon Graphics Computer Systems "Texture Mapping as a Fundamental Drawing Primitive", Proc. fourth Eurographics Workshop in Rendering, Paris, France, June, 1993, pgs. 259–266.

Other techniques well known to those skilled in computer graphic arts are also suitable for projecting the computer graphic images, such as direct pixel mapping, which employs a one-to-one correspondence between the computer memory and the useable pixel positions on the screen.

Figure 9:
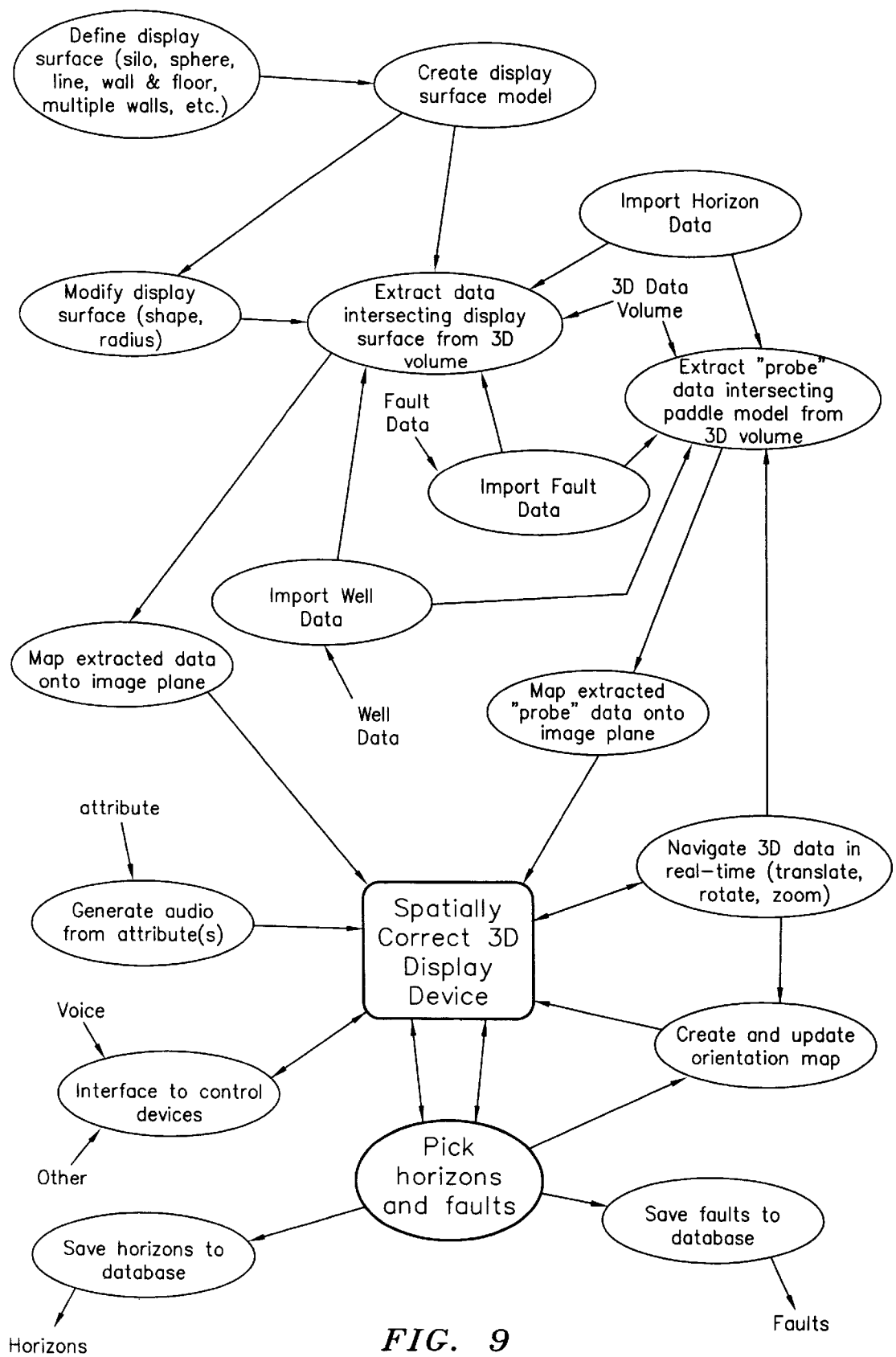
FIG. 9 is a detailed block diagram showing the overall organization of data input and processing steps for displaying spatially correct 3D seismic data on a concave display device according to this invention.

Referring now to FIG. 9, there is presented a block diagram illustrating the overall organization of external data input and processing steps for displaying spatially correct seismic data on a concave display device according to this invention. In this FIG. 9, the processing steps, which have been previously discussed with reference to FIGS. 6, 7 and 8, are encircled, the external data inputs are shown as labeled arrows entering a processing step and includes optional data such as well data, fault data, attribute data and voice data. The display screen is shown in a square in the lower center of the figure.

It will be recognized that the above described invention may be embodied in other specific forms without departing from the spirit or essential characteristics of the disclosure. Thus it is to be understood that the invention is not limited by the foregoing illustrative details, but rather is to be defined by the appended claims.

That which is claimed is:

1. A computer implemented method for projecting an enlarged computer graphic image of a three-dimensional (3D) object onto a display surface using a video projector connected to said computer, wherein said computer graphic image is projected onto a concave 3D display surface having a shape corresponding to said 3D object, and wherein said computer graphic image is derived from a volume of digitally formatted data stored in a memory of said computer, said method comprising:

a) storing said volume of digitally formatted data in said memory of said computer;

b) creating a mathematical model for a surface having a shape corresponding to said concave 3D display surface in said memory, wherein said mathematical model at least partially intersects said volume of digital data in said memory;

c) extracting data from said volume of data intersecting said mathematical model in said memory to provide an extracted data set; and d) projecting said extracted data set onto said concave 3D display surface to produce said enlarged computer graphic image of said 3D object.

2. A method in accordance with claim 1, wherein said step of creating said mathematical model comprises;

constructing at least one algebraic equation of locus including all points on the surface of said concave 3D display surface.

3. A method in accordance with claim 2, wherein said mathematical model comprises a plurality of algebraic equations describing a plurality of figures in three dimensions, wherein said figures include at least a hemisphere, a semicylinder and a semicircular plane, and wherein said plurality of equations are combined to model said concave 3D display surface.

4. A method in accordance with claim 1, wherein said step of extracting data from said volume of data intersecting said mathematical model comprises:

providing said computer with physical data for defining said mathematical model including at least:
  i) a reference point within the volume to be modeled for defining the origin of said mathematical model;
  ii) physical system dimensions including at least: physical dimensions for the surface to be displayed, and desired size and orientation of said mathematical model;

scaling said mathematical model with reference to said volume of data;

determining intersections between said mathematical model and said volume of data; and extracting data along model intersections with said volume of data to provide an extracted data set.

5. A method in accordance with claim 1, wherein said step of projecting said extracted data set comprises:

providing said computer with data concerning screen/projector geometry including at least screen/projector focal distance, and desired ray projection volume;

mathematically locating an image plane within the ray projection volume of said projector;

mapping said extracted data set onto said image plane to provide a mapped data set;

using texture mapping techniques for transferring said mapped data set from said image plane to a video image buffer; and projecting the image formed in said video image buffer.

6. A method in accordance with claim 1, wherein said step of projecting said extracted data set comprises:

providing said computer with data concerning screen/projector geometry including at least screen/projector separation distance, and desired ray projection volume;

mathematically locating an image plane within the ray projection volume of said projector;

mapping said extracted data set onto said image plane to provide a mapped data set;

using direct pixel mapping techniques for transferring said mapped data set onto a video image buffer; and projecting the image formed in said video image buffer.

7. A method in accordance with claim 1, additionally comprising the following step:

animating successive adjacent images derived from said volume of data to effect lifelike movement of said object, wherein a correct angular placement of the viewed object is maintained from an observers point of view.

8. A computer implemented method for projecting an enlarged computer graphic image of a spatially correct three-dimensional (3D) seismic data onto a concave 3D display surface using a video projector connected to said computer, wherein said computer graphic image is derived from a volume of digitally formatted 3D seismic data stored in a memory of said computer, said method comprising:

a) storing said volume of digitally formatted 3D seismic data in said memory of said computer;

b) creating a mathematical model for a surface having a shape corresponding to said concave 3D display surface in said memory, wherein said mathematical model at least partially intersects said volume of digital 3D seismic data in said memory;

c) extracting data from said volume of data intersecting said mathematical model in said memory to provide an extracted data set; and d) projecting said extracted data set onto said concave 3D display surface to produce said enlarged computer graphic image of said spatially correct 3D seismic data.

9. A method in accordance with claim 8, wherein said step of creating said mathematical model comprises;

constructing at least one algebraic equation of locus including all points on the surface of said concave 3D display surface.

10. A method in accordance with claim 9, wherein said mathematical model comprises a plurality of algebraic equations describing a plurality of figures in three dimensions, wherein said figures include a hemisphere, a semicylinder and a semicircular plane, and wherein said plurality of equations are combined to model said concave 3D display surface.

11. A method in accordance with claim 8, wherein said step of extracting data from said volume of data intersecting said mathematical model comprises:

providing said computer with physical data for defining said mathematical model including at least:
  i) a reference point within the volume to be modeled for defining the origin of said mathematical model; and
  ii) physical system dimensions including at least: physical dimensions for the surface to be displayed, and desired size and orientation of said mathematical model;

scaling said mathematical model with reference to said volume of data;

determining intersections between said mathematical model and said volume of data; and extracting data along model intersections with said volume of data to provide an extracted data set.

12. A method in accordance with claim 8, wherein said step of projecting said extracted data set comprises:

providing said computer with data concerning screen/projector geometry including at least screen/projector focal distance, and a desired ray projection volume;

mathematically locating an image plane within said ray projection volume of said projector;

mapping said extracted data set onto said image plane to provide a mapped data set;

using texture mapping techniques for transferring said mapped data set from said image plane to a video image buffer; and projecting the image formed in said video image buffer.

13. A method in accordance with claim 8, wherein said step of projecting said extracted data set comprises:

providing said computer with data concerning screen/projector geometry including at least screen/projector separation distance, and desired ray projection volume;

mathematically locating an image plane within the ray projection volume of said projector;

mapping said extracted data set onto said image plane to provide a mapped data set; and using direct pixel mapping techniques for transferring said mapped data set into a video display buffer; and projecting the image formed in said video display buffer.

14. A method in accordance with claim 8, additionally comprising:

providing a moveable paddle screen having an associated transmitter and receiver for detecting the position and orientation of said paddle screen within the volume of said concave 3D display surface; and displaying seismic data on said paddle screen corresponding to the position and orientation of said paddle screen within the volume of said concave 3D display surface, whereby the volume within said concave 3D display surface may be explored by repositioning said paddle screen.

15. Apparatus for projecting an enlarged computer graphic image of spatially correct seismic data onto a three-dimensional (3D) surface, wherein said computer graphic image is derived from a volume of digitally formatted 3D seismic data stored in a memory of said computer, said apparatus comprising:

a computer programmed for:
  i) storing said volume of digitally formatted 3D seismic data in a memory of said computer;
  ii) creating a mathematical model in said memory for a surface having a shape corresponding to said 3D surface, wherein said mathematical model at least partially intersects said volume of digital 3D seismic data in said memory;
  iii) extracting data from said volume of 3D seismic data intersecting said mathematical model to provide an extracted data set; and
  iv) projecting said extracted data set onto said display surface via a video image buffer to produce said enlarged computer graphic image of said spatially correct 3D seismic data;

a video projector connected to said computer for projecting said enlarged computer graphic image; and wherein said display surface is a concave 3D display surface for viewing said enlarged computer graphic image of said spatially correct 3D seismic data.

16. Apparatus in accordance with claim 15, additionally comprising:

a moveable paddle screen having an associated transmitter and receiver for detecting the position and orientation of said paddle screen within the volume of said concave 3D display surface; and means for displaying seismic data on said paddle screen corresponding to the position and orientation of said paddle screen within the volume of said concave 3D display surface, whereby the volume within said concave 3D display surface may be explored by repositioning said paddle screen.

17. Apparatus in accordance with claim 15, wherein said video projector is suitable for projecting a high speed graphic output of said computer, and wherein said video projector has sufficient brightness to fully illuminate said concave 3D display surface.

18. Apparatus in accordance with claim 15, wherein said computer has a texture mapping graphic system.

19. Apparatus in accordance with claim 15, wherein said computer programmed step of creating said mathematical model comprises;

constructing at least one algebraic equation of locus including all points on the surface of said concave 3D display surface.

20. A program storage device, readable by a computer, tangibly embodying a program of instructions executable by said computer to perform method steps for projecting an enlarged computer graphic image of a spatially correct three-dimensional (3D) seismic data onto a concave 3D display surface using a video projector connected to said computer, wherein said computer graphic image is derived from a volume of digitally formatted 3D seismic data stored in a memory of said computer, said method steps comprising:

a) storing said volume of digitally formatted 3D seismic data in said memory of said computer;

b) creating a mathematical model for a surface having a shape corresponding to said concave 3D display surface in said memory, wherein said mathematical model at least partially intersects said volume of digital 3D seismic data in said memory;

c) extracting data from said volume of 3D seismic data intersecting said mathematical model in said memory to provide an extracted data set; and d) projecting said extracted data set onto said concave 3D display surface via a video image buffer to produce said enlarged computer graphic image of said spatially correct 3D seismic data.

* * * * *